US008554680B2

(12) United States Patent
Newcombe

(10) Patent No.: US 8,554,680 B2
(45) Date of Patent: Oct. 8, 2013

(54) METHOD AND SYSTEM FOR SECURE DISTRIBUTION OF SUBSCRIPTION-BASED GAME SOFTWARE

(75) Inventor: Christopher R. Newcombe, Kirkland, WA (US)

(73) Assignee: Noatak Software LLC, Las Vegas, NV (US)

( * ) Notice: Subject to any disclaimer, the term of this patent is extended or adjusted under 35 U.S.C. 154(b) by 1094 days.

(21) Appl. No.: 12/185,038

(22) Filed: Aug. 1, 2008

(65) Prior Publication Data

US 2008/0293486 A1 Nov. 27, 2008

Related U.S. Application Data

(62) Division of application No. 09/999,180, filed on Nov. 29, 2001, now Pat. No. 7,409,061.

(60) Provisional application No. 60/250,058, filed on Nov. 29, 2000.

(51) Int. Cl.
*G06Q 99/00* (2006.01)

(52) U.S. Cl.
USPC .......................................................... 705/50

(58) Field of Classification Search
USPC .................................................. 705/50–79
See application file for complete search history.

(56) References Cited

U.S. PATENT DOCUMENTS

| 4,731,841 A | 3/1988 | Rosen |
| 5,201,000 A | 4/1993 | Matyas |
| 5,539,822 A | 7/1996 | Lett |
| 5,553,242 A | 9/1996 | Russell |
| 5,629,980 A * | 5/1997 | Stefik et al. ..................... 705/54 |
| 5,694,469 A | 12/1997 | Le Rue |
| 5,717,756 A | 2/1998 | Coleman |
| 5,757,891 A | 5/1998 | Wang |
| 5,946,664 A | 8/1999 | Ebisawa |
| 5,982,898 A | 11/1999 | Hsu |
| 6,036,601 A | 3/2000 | Heckel |
| 6,058,397 A | 5/2000 | Barrus |
| 6,084,969 A | 7/2000 | Wright |
| 6,099,408 A | 8/2000 | Schneier |
| 6,196,920 B1 | 3/2001 | Spaur |
| 6,226,618 B1 | 5/2001 | Downs |

(Continued)

FOREIGN PATENT DOCUMENTS

EP 0534420 A2 3/1993

OTHER PUBLICATIONS

"Fairplay—Wikipedia, the free encyclopedia", 9 pages, printed Mar. 23, 2010.

(Continued)

*Primary Examiner* — James D Nigh

(57) ABSTRACT

Methods and systems for securely distributing software in a subscription-based environment are provided. A Game Security Facility ("GSF") associated with a game server manages secure communications with game clients. A subscriber is registered in a manner that includes a unique identifier of the machine upon which the subscription data will reside. Encryption keys are generated for the registered subscriber and encrypted subscription data is exchanged, thus preventing unauthorized copying to another machine or unauthorized use by a third party. The subscriber is re-registered, and new encryption keys are generated. Access is enabled to the previously exchanged encrypted subscription data without causing the previously exchanged data to be re-downloaded.

20 Claims, 9 Drawing Sheets

(56) References Cited

U.S. PATENT DOCUMENTS

| | | | |
|---|---|---|---|
| 6,347,145 B2* | 2/2002 | Kato et al. | 380/284 |
| 6,424,718 B1 | 7/2002 | Holloway | |
| 6,447,396 B1 | 9/2002 | Galyean, III | |
| 6,508,710 B1 | 1/2003 | Paravia | |
| 6,599,194 B1 | 7/2003 | Smith | |
| 6,616,533 B1 | 9/2003 | Rashkovskiy | |
| 6,654,886 B1 | 11/2003 | Challener | |
| 6,668,323 B1 | 12/2003 | Challener | |
| 6,792,113 B1 | 9/2004 | Ansell | |
| 6,928,414 B1 | 8/2005 | Kim | |
| 6,954,728 B1 | 10/2005 | Kusumoto | |
| 6,978,017 B2* | 12/2005 | Wiener et al. | 380/30 |
| 7,024,690 B1 | 4/2006 | Young | |
| 7,047,411 B1 | 5/2006 | DeMello | |
| 7,051,209 B1 | 5/2006 | Brickell | |
| 7,062,658 B1* | 6/2006 | Cheriton et al. | 713/189 |
| 7,089,211 B1* | 8/2006 | Trostle et al. | 705/51 |
| 7,251,632 B1 | 7/2007 | Ogg | |
| 7,461,249 B1 | 12/2008 | Pearson | |
| 2001/0019615 A1* | 9/2001 | Kato et al. | 380/286 |
| 2001/0034661 A1 | 10/2001 | Ferreira | |
| 2002/0156858 A1 | 10/2002 | Hunter | |

OTHER PUBLICATIONS

Digital rights management—Wikipedia, the free encyclopedia, 25 pages, printed Mar. 23, 2010.

Notice of Allowance on U.S. Appl. No. 11/514,297, mailed Jan. 29, 2010.

Arkin, B., et al., "How We Learned to Cheat in Online Poker: A Study in Software Security," Developer.com, Sep. 28, 1999, 9 pages.

Cortright, A., "What Is a 'Bulk Encryption Key'?" Newsgroups: comp.groupware.lotus-notes.admin, Jul. 28, 1999, <http://groups.google.com/groups?q=bulk+encryption . . .> [retrieved Apr. 30, 2002], 1 page.

Intihar, B., "OLA Offers New Form of Advertising," GameWEEK Magazine, Oct. 2, 2000, pp. 1, 6.

"Massively Multiplayer Online Role-Playing Game," Wikipedia, <http://en.wikipedia.org/wiki/MMORPG> [retrieved Sep. 11, 2007], 10 pages.

Notice of Allowance on U.S. Appl. No. 12/797679, mailed Mar. 21, 2012.

Non-Final Office Action on U.S. Appl. No. 12/797,679 mailed Nov. 23, 2011.

* cited by examiner

METHOD AND SYSTEM FOR SECURE DISTRIBUTION OF SUBSCRIPTION-BASED GAME SOFTWARE

CROSS-REFERENCES TO RELATED APPLICATIONS

This application is a divisional of U.S. patent application Ser. No. 09/999,180, filed Nov. 29, 2001, which claims the benefit of U.S. Provisional Patent Application No. 60/250,058, filed Nov. 29, 2000, the disclosures of which are incorporated by reference herein in their entirety.

BACKGROUND

The present invention relates to distributing subscription-based software and, in particular, to a computer system for securely distributing game software.

In a gaming environment, it has been typical to have network-based games, called Massive Multiplayer Role Playing Games (MMRPGs), which are paid for by means of a subscription fee for some time interval or fixed usage. In these games, thousands of players, each having their own Internet connection, interact on a world server or set of servers. Players can see and interact with one another and with the machine-controlled characters, such as monsters and other permanent characters, etc., that are in the game. Some of the more popular MMRPGs are Ultima Online by Electronic Arts, Inc., Everquest by Sony Online Entertainment, Asheron's Call by Turbine Games, and Half-life by Valve.

FIG. 1 is an example block diagram of a typical MMRPG environment. Typically in an MMRPG, a game player 100 registers with a game server 130 to pay for the player's subscription and establishes an account with billing information and a password. The game server 130 then sends initial game client software 140 to be downloaded onto the game client system 110. This downloading process typically takes a long time, for example, upwards of 10 minutes for 600 MB of data using a fast broadband connection. Once the game player 100 has successfully registered and downloaded the game client software 140, the game client system 110 can then log into the network 120 and initiate a session or other type of communication between the game client system 110 and a game server 130. The game player typically logs into the game server 130 with the account and password information setup during the registration process that uniquely identifies that player, for example. Once communication is established, the game server 130 and the game client system 110 exchange messages containing session data 150 that is used to play the game.

The messages exchanged may or may not be sent using a secure communication protocol. If the data is sent without sufficient security, then hackers (malicious or otherwise) can intercept these messages, affecting both the playability of the game and, in effect, "stealing" intellectual property that the game player has paid for. Thus, managing the intellectual property rights of digital information obtained through a paid-subscription download is a challenging problem, especially when the subscribers possess technical sophistication as is often the case with computer game players.

SUMMARY

Embodiments of the present invention provide methods and systems for securely distributing software in a subscription-based environment, specific examples of which are computer game systems such as Massive Multiplayer Role Playing Games (MMRPGs). Example embodiments of the present invention provide a Game Security Facility for enabling the secure distribution of game client software (such as game client software) and secure communication of game session data between a game client system and the game server or associated other server systems.

In one embodiment, the Game Security Facility ("GSF") supports the ability to uniquely encrypt downloaded data for each individual customer and, optionally, to uniquely encrypt downloaded data for a single physical machine, in a manner that allows customers to change their public/private key pairs without forcing a complete reload of all data.

In some embodiments, RSA-type key generation algorithms are enhanced to generate a pass-phrase that includes a code tied to a unique modifier of a client device. In one such embodiment, the code is based upon a network interface card identifier.

In one embodiment, the GSF includes an account manager for securely managing customer subscription-related account information. In another embodiment, the GSF includes a secure communications module for implementing the secure communications protocols described herein.

In another embodiment, the GSF provides techniques that aid in the detection of fraudulent subscription-downloads by real-time or off-line analysis of data-download patterns. In one embodiment, the GSF examines IP addresses and public keys in conjunction with download patterns to detect patterns outside of the typical pattern associated with a particular IP address—public key pair.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 is an example flow diagram of a digital rights management routine of an example embodiment of a Game Security Facility;

DETAILED DESCRIPTION

Embodiments of the present invention provide methods and systems for securely distributing software in a subscription-based environment, specific examples of which are computer game systems such as Massive Multiplayer Role Playing Games (MMRPGs). Example embodiments of the present invention provide a Game Security Facility for enabling the secure distribution of game client software (such as game client software 140 in FIG. 1) and secure communication of game session data between a game client system and the game server or associated other server systems. For example, the concurrently filed patent application entitled "Method and System for Dynamically Incorporating Advertising Content into Multimedia Environments," which is herein incorporated by reference in its entirety, describes a game environment where ad servers communicate with game client systems and game servers to dynamically insert advertisements into games. In that environment, event messages describing the ads that are downloaded and measurements of the effectiveness of these ads are exchanged between the game client and ad server. These messages are used to generate reporting and billing information, and thus contain private data that is unique to each game player.

Figure 1:
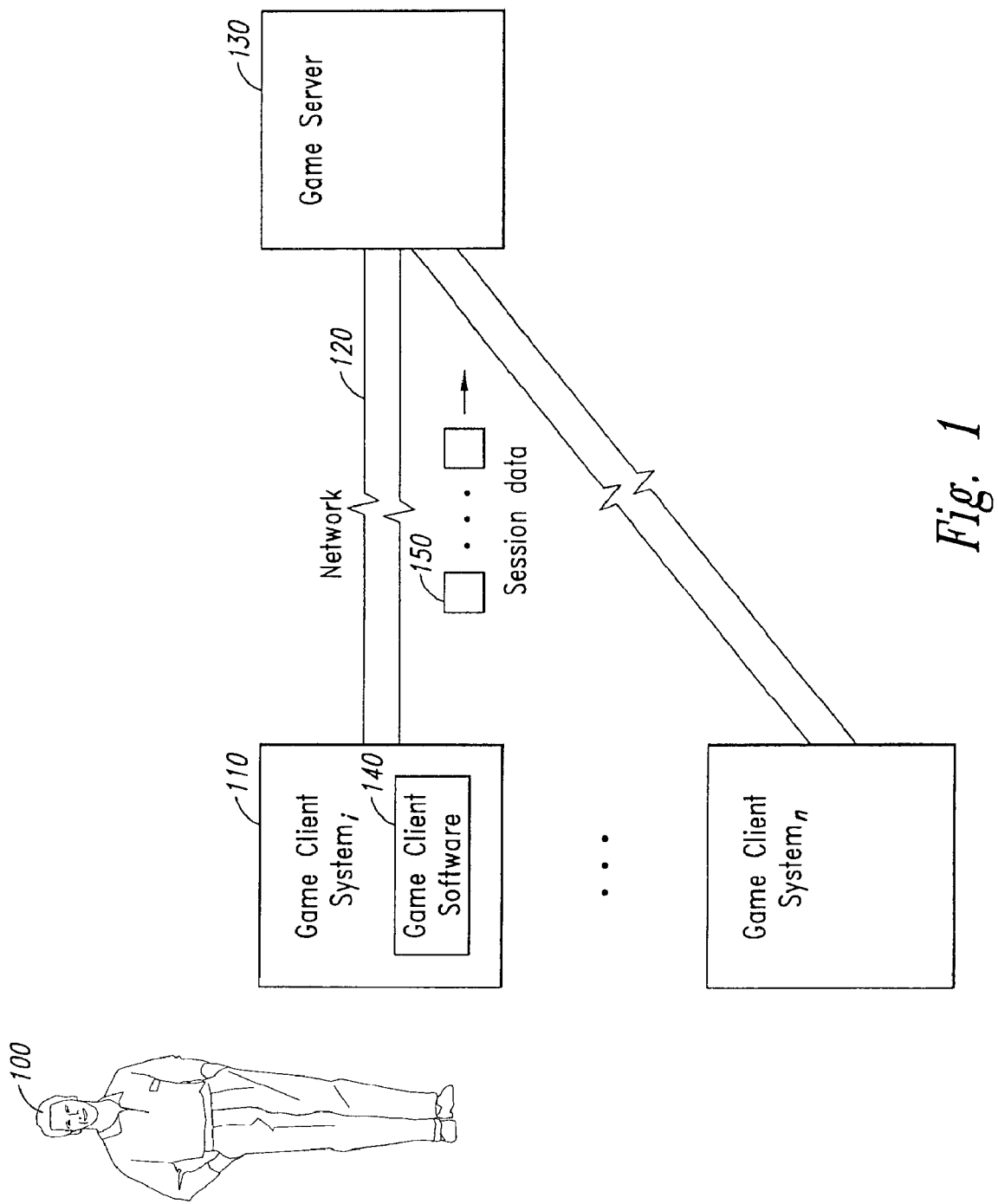
FIG. 1 is an example block diagram of a typical MMRPG environment.

In such environments, and in other subscription-based environments, it is desirable to use some type of secure communication scheme to prevent unauthorized use of the data, such as game session data 150 in FIG. 1. Ideally, all paid-for data should be transmitted to a game client system and stored there under strong encryption, such as ciphertext (encrypted data) that has been encrypted using a separately encrypted key, thus requiring a two-step decryption process to decipher the encrypted data.

The Game Security Facility ("GSF") of the present invention provides several levels of security to data and software exchanged between the game client system and the game server (or ad server) and between the game server and the ad server when the game server acts as a proxy for a particular game client system. One skilled in the art will recognize that one or more of these levels can be implemented in a particular embodiment and provide varying degrees of security. In summary, the GSF supports the ability to uniquely encrypt downloaded data for each individual customer and, optionally, to uniquely encrypt downloaded data for a single physical machine, in a manner that allows customers to change their public/private key pairs without forcing a complete reload of all data. Unique encryption per individual customer hinders the unauthorized exchange of data between customers; whereas unique encryption for a single physical machine hinders the ability of a customer to easily copy it to other machines without authorization. In addition, the GSF provides techniques that aid in the detection of fraudulent subscription-downloads by real-time or off-line analysis of data-download patterns. One skilled in the art will also recognize that, although the description herein is oriented primarily towards subscription game software, the techniques of the methods and systems of the present invention can be applied to other subscription-based software or data downloaded in a distributed environment.

Figure 2:
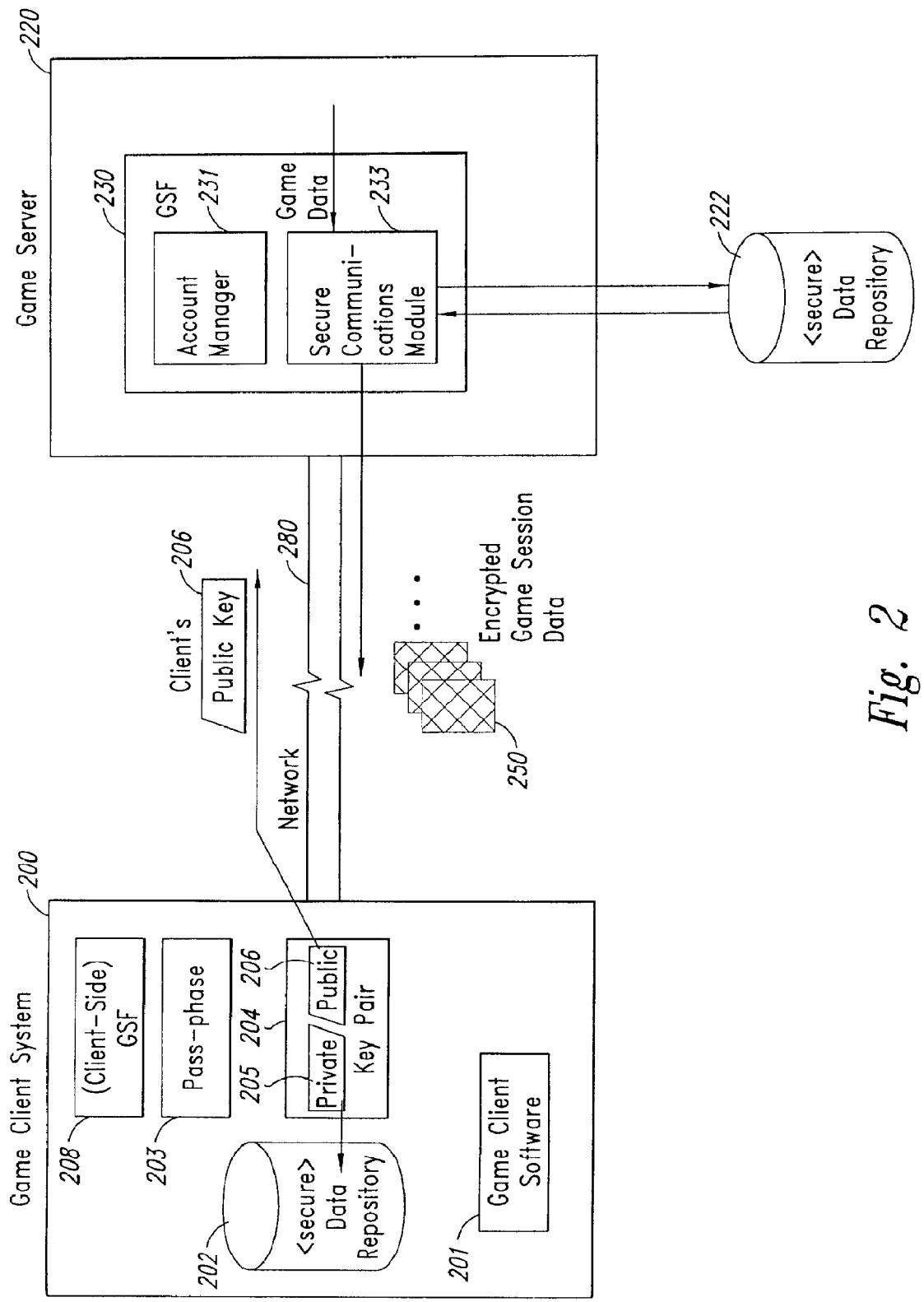
FIG. 2 is an example block diagram of a Game Security Facility as used in a subscription-based game environment.

FIG. 2 is an example block diagram of a Game Security Facility as used in a subscription-based game environment. In FIG. 2, a game client system 200 registers with and pays a subscription fee to a game server 220. The game server 220 interacts with the GSF 230 to provide secure registration using secure account manager 231. Secure data, such as keys used to encrypt/decrypt data and accounting information retrieved during registration are stored on the game server 220 in a secure data repository 222. The game server 220 also interacts with the GSF 230 through a secure communications module 233 to provide secure communications of game session data 250 over communications medium 280. One skilled in the art will recognize that communications medium 280 could be a wired network connection, such as the Internet, or a wireless transmission medium, such as through a telephone carrier, assuming that the use of such wireless medium becomes more feasible for executing these types of games over time. Preferably, secure game session data 250 is stored when downloaded to the game client system 200 in a secure data repository 202, although the techniques used herein can also be implemented using an unsecure data repository on the client side. The game client system 200 and game server 220 can be implemented on general-purpose computer systems, and one skilled in the art will recognize that the various components of these systems can be distributed in a variety of ways without affecting the techniques described for the purposes herein. For example, the GSF 230 may reside on a physically separate computer system from the game server and, in fact, act as a separate server.

The GSF cooperates with a game server (e.g., game server 220) and the game client software (e.g., game client software 200) to provide different types of security at potentially different times during a client-server session. The GSF uses enhancements to existing security mechanisms, such as PGP and RSA-type public/private key pair cryptography, to provide additional security more appropriate to a subscription-based software environment. A detailed description of PGP and extensive background information on cryptography techniques are found in Garfinkel, Simson, "PGP: Pretty Good Privacy," O'Reilly and Associates, 1995, and Menezes et al., "Handbook of Applied Cryptography," CRC Press LLC, 1997, respectively, which are incorporated herein by reference in their entirety. A basic understanding of general cryptography and PGP terms is assumed in the following description. In a typical embodiment, the GSF provides a client side component 208 that provides enhancements to a selected publicly available secure communications protocol. Although one embodiment of the methods and systems of the present invention uses and provides enhancements to an RSA-type public/private key pair system (such as PGP), one skilled in the art will recognize that appropriate modifications can be made to a variety of well-known cryptographic techniques to achieve the techniques presented herein without undue experimentation.

In one embodiment, the client side GSF 208 upon registration creates a pass-phrase 203, which is used by the secure communications protocol (e.g., PGP, in the case of an asymmetric key protocol) to produce a key pair 204. The key pair 264 contains a private key 205, which preferably is encrypted and stored in secure data repository 202, and a public key 206, which is sent for future secure client-specific communication. The customer's public key 206 is stored in some memory available to the GSF 230, for example, secure data repository 222, although such "public" keys do not need to be stored in a secure fashion.

The techniques used by the GSF for encryption and decryption are preferably very fast due to the delay the customer encounters when invoking an application that is required to decrypt copious amounts of data before making the information available to the customer. Also, because the game server encrypts a large volume of data for large numbers of different customers, the encryption routines of the game serve preferably minimize the latency involved in downloading encrypted data.

Figure 3:
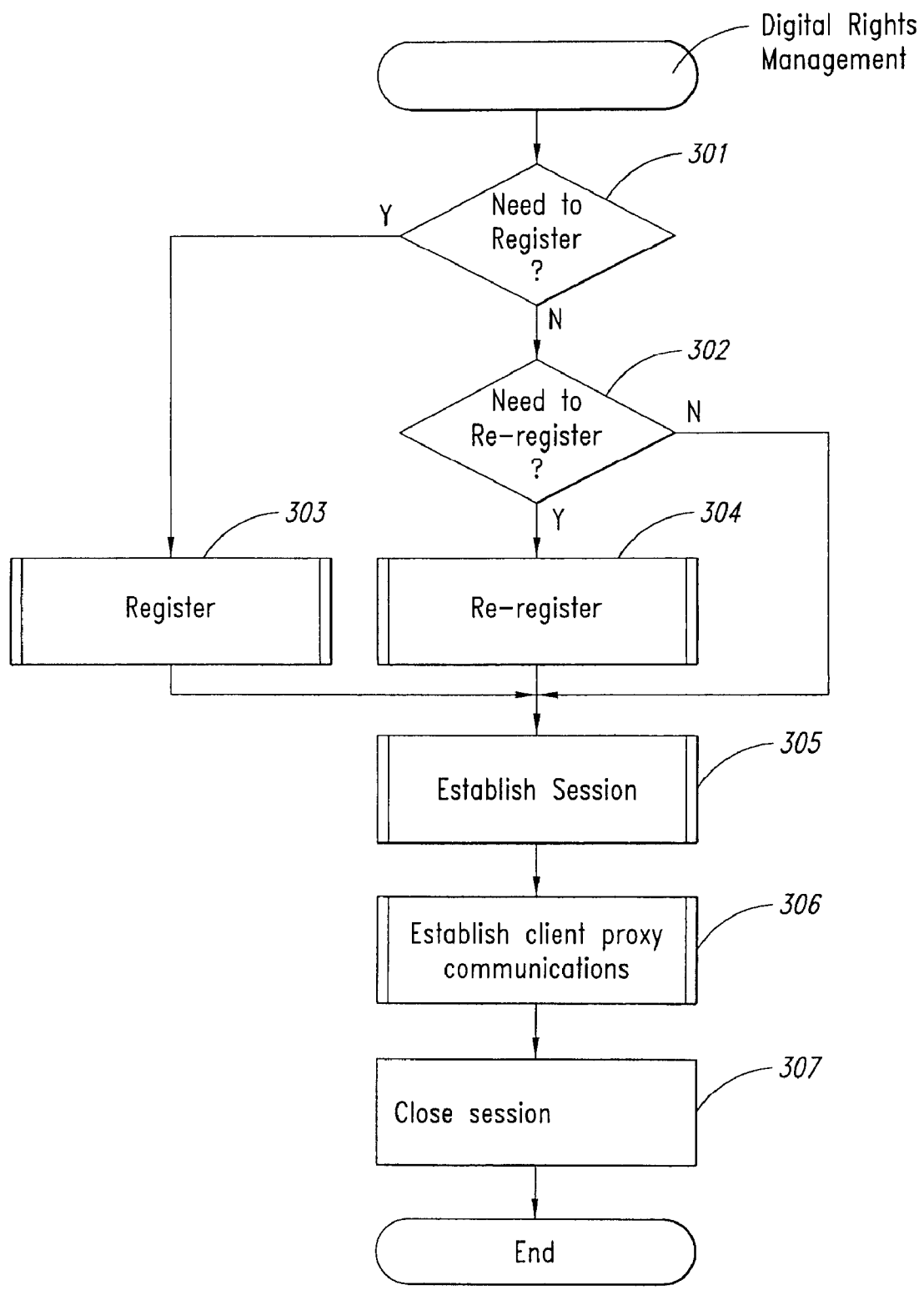
FIG. 3 is a block diagram depicting a typical registration process in an example Game Security Facility.

FIG. 3 is an example flow diagram of a digital rights management routine of an example embodiment of a Game Security Facility. This routine is used, for example, by a game server to validate a customer, establish a secure communications link for game sessions, and establish client proxy communications, such as for communication by a game server with an ad server on behalf of a particular client. The digital rights management routine initially determines whether a customer is a registered user or needs to re-register. A customer may need to re-register if the customer is, for example, using a different computer, or a different username. The registration routine establishes cryptographic keys and obtains customer information used for billing. The re-registration routine also obtains customer information and generates cryptographic keys and additionally sends an encrypted list of one-time session keys to the game client for use in decrypting previously downloaded data, as will be explained further below. Additionally, the digital rights management routine establishes a secure session with a game client by using a one-time random symmetric session key and uses a public/private key pair encryption method to further encrypt transmissions between the game server and the game client.

In particular, in step 301, the digital rights management routine determines whether a user who desires to obtain access to subscription data needs to be registered. If so, the routine proceeds to step 303, else the routine proceeds to step 302. In step 302, the routine determines instead whether the user is a customer who needs to re-register. Re-registration may be indicated, for example, when a customer wants to use a different client machine than previously used for registration, or when the user's public/private key pair has been compromised. If the routine determines that the user does not need to re-register, the routine proceeds to step 305 to establish a session, else, the routine proceeds to step 304. In step 303, the routine invokes the Register routine to pay for the subscription, obtain user information, and to generate a public/private key pair for the customer (such as key pair 204 in FIG. 2). In step 304, the routine invokes the Re-register routine to obtain user information, generate a public/private key pair for the customer, and to securely send an encrypted list of one-time session keys from the game server to the game client for use in decrypting previously stored encrypted files, such as game session data. In step 305, the routine invokes the Establish Session routine to validate the customer and establish a secure communication link by using the previously issued public/private key pair to securely transmit a one-time random session key.

In some cases, the digital rights management routine detects that the game server desires to engage in proxy communications on behalf of a game client system. This could occur, for example, in embodiments that implement a distributed game client, where a portion of the game client resides on the game server. Typically, a server-side game client component maintains state information relating to the specific client. As discussed previously, in an example embodiment where a game server is used in conjunction with an ad server, there are times when it is more efficient, for example, reporting certain ad-related and billing information to the ad server, to by-pass the portion of the game client that resides on the game client system. In such cases, the routine establishes client proxy communications in step 306. This routine establishes proxy communications by requiring the game client system to inform the target server, in this example, the ad server, to which game server it is connected (who is authorized to act as a proxy).

In step 307, the routine closes the session established in step 305 upon notification by the customer. One skilled in the art will appreciate that other methods may be used such as a timeout after a predetermined period of inactivity has expired, expiration of an allotted time for the communication, or breach of transmission protocols that may indicate a security violation.

Figure 4:
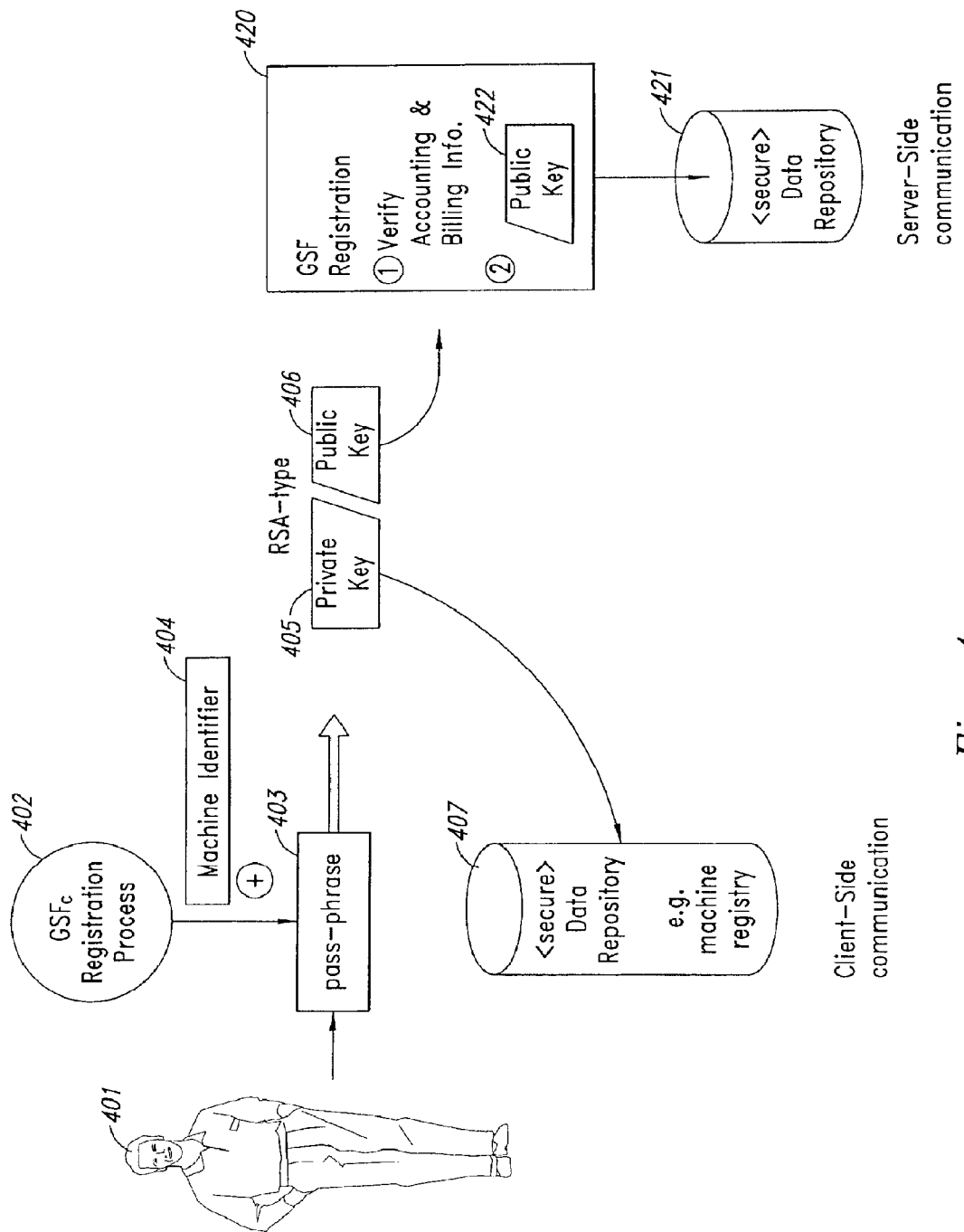
FIG. 4 is an example flow diagram of a registration routine of an example embodiment of a Game Security Facility.

FIG. 4 is a block diagram depicting a typical registration process in an example Game Security Facility. A user 401 uses the client-side GSF Registration Process 402 to define a pass-phrase 403. The pass-phrase 403 is used by the cryptography routines to generate the key pairs and for other security tasks. In one embodiment, the client-side GSF Registration Process 402 transparently incorporates a machine identifier 404 into the pass-phrase. Although referred to as the client-side GSF 402, one skilled in the art will recognize that other arrangements are possible. This machine identifier may be, for example, the network card serial number of the machine, which is guaranteed to be unique. This incorporation is performed when it is desired to have the client-side GSF support encryption that is unique per machine as well as unique per customer. The client-side GSF then uses the modified pass-phrase to generate a unique RSA-type key pair consisting of private key 405 and public key 406. The private key 405 is preferably stored in a secure data repository 407, as mentioned, on the game client system. However, it can be stored in a machine registry for simplicity, which, depending upon the system implementation, may or may not be secure. The public key 406 is sent to the GSF Registration routine (part of the Secure Communications Module 233 in FIG. 2), which stores it in a secure data repository 421, accessible to the GSF. Prior to accepting this public key (and in some implementations prior to its generation), the GSF verifies the user's accounting and billing information so that a subscription is completed.

Figure 5:
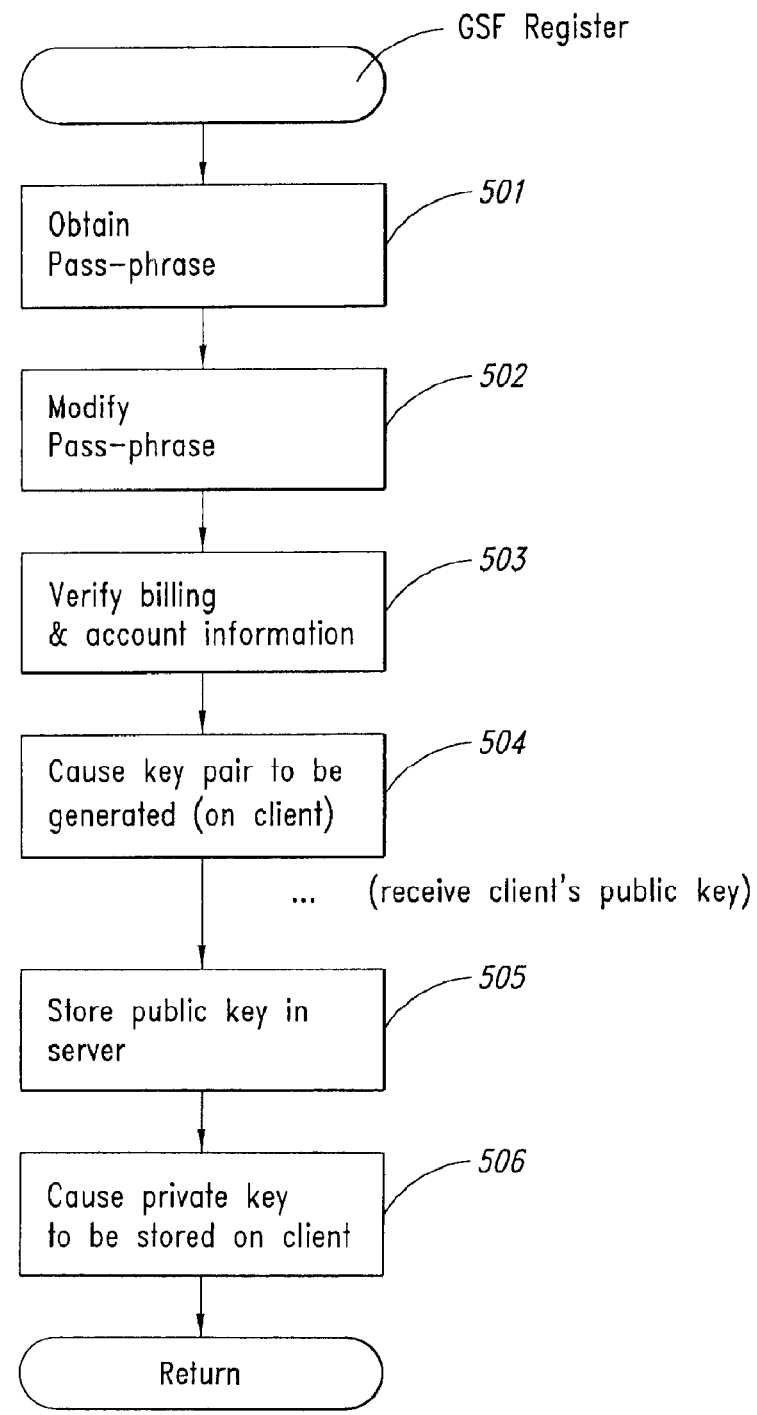
FIG. 5 is an example flow diagram of a registration routine of an example embodiment of a Game Security Facility.

FIG. 5 is an example flow diagram of a registration routine of an example embodiment of a Game Security Facility. The registration routine implements the scenario depicted in FIG. 4. In step 501, the user is prompted to enter a pass-phrase, which can be used to encrypt the (to be) generated private key for storage in the secure data repository (e.g., machine registry 407), for example, to prevent malicious key harvester routines from disclosing the private key to an unauthorized party. The pass-phrase may also be used for identification of the customer in future communications and in generating digital signatures, which can be added to the secure communications provided by techniques described herein. In step 502, the routine may optionally allow the pass-phrase to be modified, as described, to incorporate a unique network interface card (NIC) address. This "ties" any stored encrypted information to a machine with a network interface card having the same address, which prevents customers from impermissibly transferring valuable protected information to another machine. In step 503, the routine obtains from the customer personal information such as a credit card number for billing and the billing address of the customer. Ideally this information is verified through other channels of communication such as verification of the credit card number and billing address with an on-line credit card verification company. In step 504, the routine causes an RSA-type public/private key pair to be generated on the game client system (typically through the client-side GSF). The public/private key pair should be generated on the game client system so that the generated private key is known only to the game client system and is not possibly compromised by transmission across an unsecured network. As described above, the algorithms for generating such a public/private key pair are well known in the art and therefore not discussed herein. According to one embodiment of the invention, GSF client-side code is downloaded to the game client system, where it is then executed to generate a new public/private key pair for use on the customer's machine. In step 505, the routine receives the newly generated public key transmitted by the client-side GSF routine to the game server and optionally sends the newly generated public key to potential ad servers or stores the newly generated public key in public registry that may be accessed by the potential ad servers. In step 506, the routine causes the client-side GSF routine to store the newly generated private key in a registry, such as the system registry, in the game client machine. For protection against the malicious key harvester programs discussed above, the private key can be stored in encrypted form in the registry by using, for example, the pass-phrase obtained from the customer in step 501, although some customers may object to being required to supply a pass-phrase each time they want to invoke a program requiring the encrypted private key. As noted above with reference to step 502, the pass-phrase may be modified using the NIC address, if present, in the customer's machine in order to discourage unauthorized transference of protected data from the client machine to other machines.

As described with respect to step 305 in FIG. 3, once a customer is registered, then providing re-registration is not required, the customer (game player) can now establish game secure game sessions. The first such secure session is typically used to download the game software to the client initially. The same techniques discussed for use with that purpose are used generally to communicate in game session data between the game client system and the game server.

Figure 6:
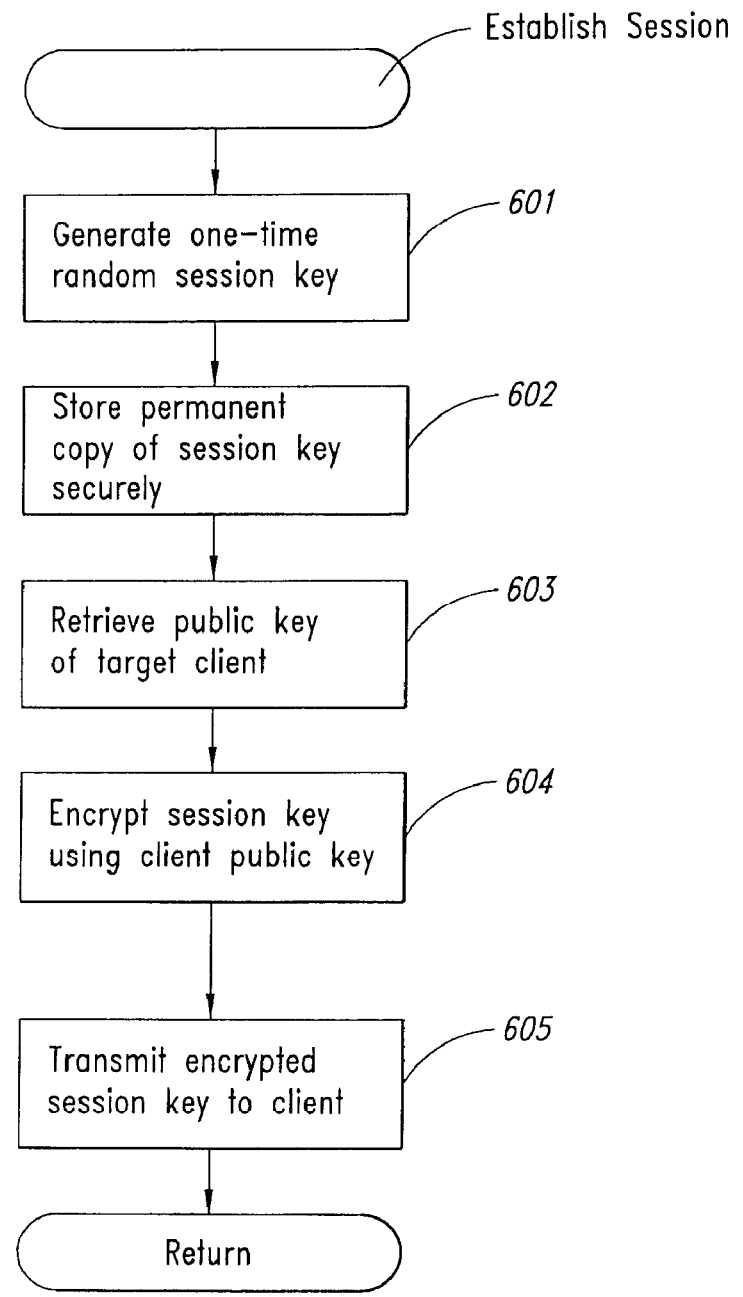
FIG. 6 is an example flow diagram of an establish session routine of an example embodiment of a Game Security Facility.

FIG. 6 is an example flow diagram of an establish session routine of an example embodiment of a Game Security Facility. The establish session routine uses encrypted communications to validate the identity of the game client systems, as well as to securely transmit a one-time random symmetric session key that is used to encrypt transmissions within an established session. The symmetric session keys used for a particular client are preferably stored in a secure data repository available to the GSF, and each session key is mapped (using, for example, well-known database techniques) to the file names for files that the game server has encrypted using that key. The use of these keys and the stored associations provide the ability for a customer to generate a new key pair (for example, to run the game from new hardware) and not be forced to re-download all previously downloaded software.

Specifically, in step 601, the establish session routine generates a unique, one-time random session key, preferably using a well-known symmetric key algorithm. In step 602, the routine stores a permanent copy of the newly generated one-time random session key in a secure data repository accessible by the GSF, with copies of previously generated one-time random session keys that have been used in the previous sessions with the same client. If no such list of one-time random session keys exists for a particular customer, a new list is created. The keys are stored per client and with indications for each key of the files (e.g., filenames) that were encrypted using the key. In step 603, the routine retrieves the public key of the client with whom the game server is attempting to establish a communications session. In step 604, the routine encrypts the newly generated one-time random session key using the retrieved public key of the client. The game server (GSF portion thereof) can now use the encrypted one-time random session key to encrypt and decrypt session data transmitted across the network during the remainder of the session. When the game client receives encrypted session data, it decrypts the message using its private key to retrieve the one-time random session key and then uses the decrypted session key to decrypt the session data. In step 605, so that the client can use the same session key, the establish session routine transmits the encrypted one-time random session key to the client-side GSF across a network such as the Internet, and then returns.

Figure 7:
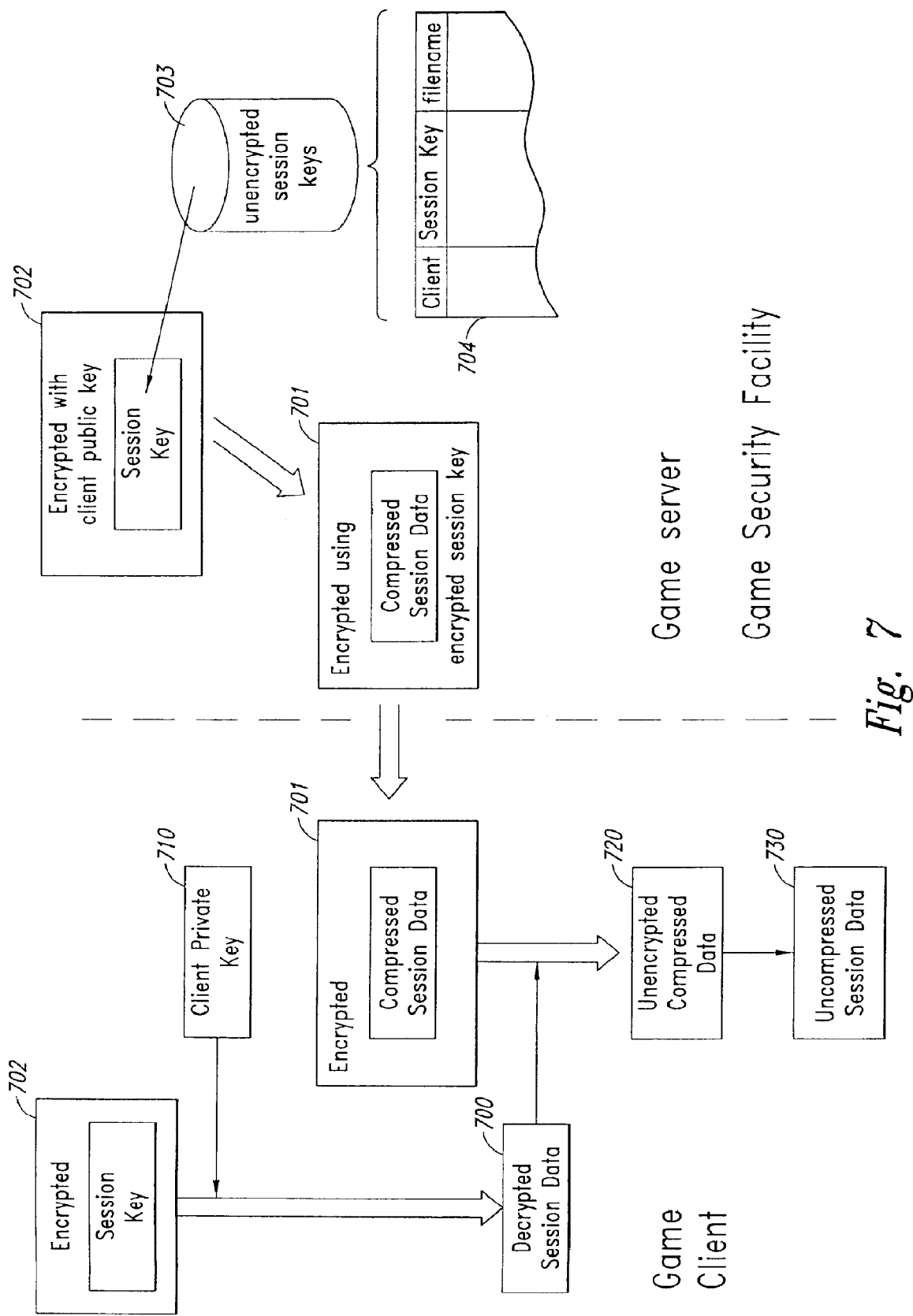
FIG. 7 is an example schematic diagram of encryption and decryption of session data between a Game Security Facility and a game client.

FIG. 7 is an example schematic diagram of encryption and decryption of session data between a Game Security Facility and a game client. The session data 701 is shown encrypted using a client target encrypted version 702 of the session key 700. A secure version of the session key 700 is stored in the data repository 703. Once the encrypted session data 701 is sent to the game client, the game client can decrypt it. The game client applies a client private key 710 to the previously transmitted encrypted session key 702 to retrieve the decrypted session key 700. The game client then applies the decrypted session key 700 to the encrypted session data 701 to retrieve the session data. In one embodiment, the session data is compressed when it is unencrypted (see, for example, unencrypted compressed session data 720). The game client then applies standard decompression algorithms to retrieve unencrypted, uncompressed session data 730.

A similar process and schematic works in reverse for communications from the game client to the game server, except that the game client encrypts the session key using the game server's public key and then encrypts session data using the encrypted session key targeted to the game server. The game server correspondingly decrypts the session key using its own private key and then decrypts the session data sent from the client using the decrypted session key. Alternatively, if the game server is able to determine in other ways from which game client a communication is received, then the game server can simply retrieve the appropriate session key from the secure data repository.

Those skilled in the art will recognize that the communications may be made more secure by adding more layers of cryptography, digital signatures, or increasing key length, for example, or less cryptographic techniques for certain transmissions that may not require a greater degree of confidentiality. One skilled in the art will also recognize that increasing the security of the transmissions through cryptography generally increases the computational power required for decrypting and thus increases the latency of a more heavily encrypted transmission.

As stated, one of the advantages of the techniques herein is that a customer can change machines without needing to reinstall the complete inventory of downloaded game and session data.

Figure 8:
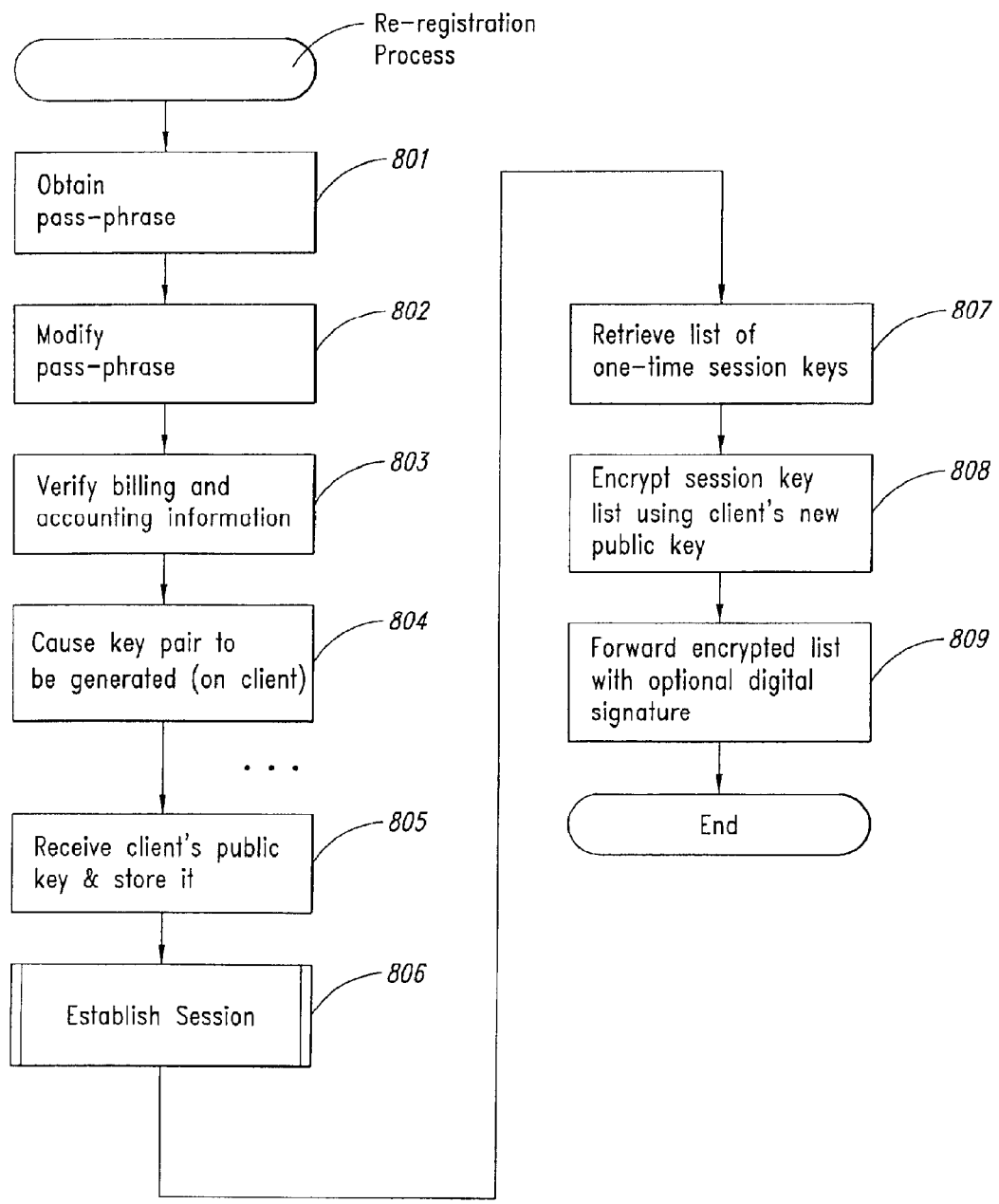
FIG. 8 is an example flow diagram of the re-registration process of an example embodiment of a Game Security facility.

FIG. 8 is an example flow diagram of the re-registration process of an example embodiment of a Game Security facility. The re-registration process is invoked whenever the game client needs to access previously encrypted data stored on the game client using a different encryption key. One possible scenario is when it is indicated that a customer's private key is no longer secure and it is desirable for the customer to obtain a new public/private key pair. Another possible scenario is when the game client needs to access encrypted data stored on the game client that has been encrypted using an older private key of the game client. This situation can occur when the game client's private key is modified by the GSF to incorporate the unique address from the network interface card (see, for example, FIG. 4). If the game client either changes its network interface card address through changing the network interface card or by copying the encrypted files to a new machine having a different card, the customer will need to re-register so that the previously downloaded encrypted files can be accessed rather than requiring a full download. Such a download is undesirable due to the often relatively slow data transfer rates across a network and the relatively large sizes of the files involved.

Specifically, in step 801, the re-registration routine prompts the customer for a pass-phrase. The pass-phrase may be optionally used to encrypt the customer's private key for secured storage in the game client's registry as discussed earlier. In step 802, the routine optionally modifies the passphrase that is used to encrypt and securely store the game client's private key by retrieving the address of the network interface card and using the address to modify the passphrase. (See corresponding step 502 in FIG. 5). Again, this will bind the key pair to the customer's current machine, thus protecting newly downloaded data from being moved to another machine. In FIG. 8 at 803, the routine verifies existing customer billing and accounting information. One skilled in the art will appreciate that highly private information such as credit card numbers should not be presented to users who are re-registering. An example embodiment of the invention prompts the user to reenter all such information and compares it with the information stored. Ideally, the game server will verify any new information submitted by the game client through a separate channel of communication. In step 804, the routine causes a new public/private key pair to be generated on the game client, through the client-side GSF. In step 805, the routine receives a transmitted version of the newly generated public key to the game client and stores it, optionally to a registry for access by an ad server. In step 806, a session is optionally established as described with reference to FIG. 6 to validate the identities of the parties of the communication link and to provide a layer of encryption using symmetric keys. In step 807, the GSF retrieves the list of one-time session keys that previously have been used in communications with that game client and stored on the game server. Digital signatures are well known in the art and need not be discussed in depth herein. The game server uses a hash-like algorithm to provide a signature of the file containing the list of one-time session keys. A signed digital signature can be used to validate the identity of the sender as well as to validate that the message has not been corrupted, which provides against spoofing. In step 808, the list of one-time session keys stored on the game server is encrypted using the received game client's public key. One skilled in the art will appreciate that the cryptographic techniques used in steps 806-808 can be used singly or together to provide varying levels of security, with more layers of cryptography being more secure but requiring more processing time to complete communications. In step 809, the encrypted list of one-time session keys is sent with the optional digital signature to the game client.

Once the game client receives the encrypted list of one-time session keys, it can decrypt and use the unencrypted session keys to read the previously downloaded data. In one embodiment, a utility is provided to replace the encrypted old session keys that are attached to the downloaded files with new session keys. In another embodiment they are replaced on a file-by-file basis.

Figure 9:
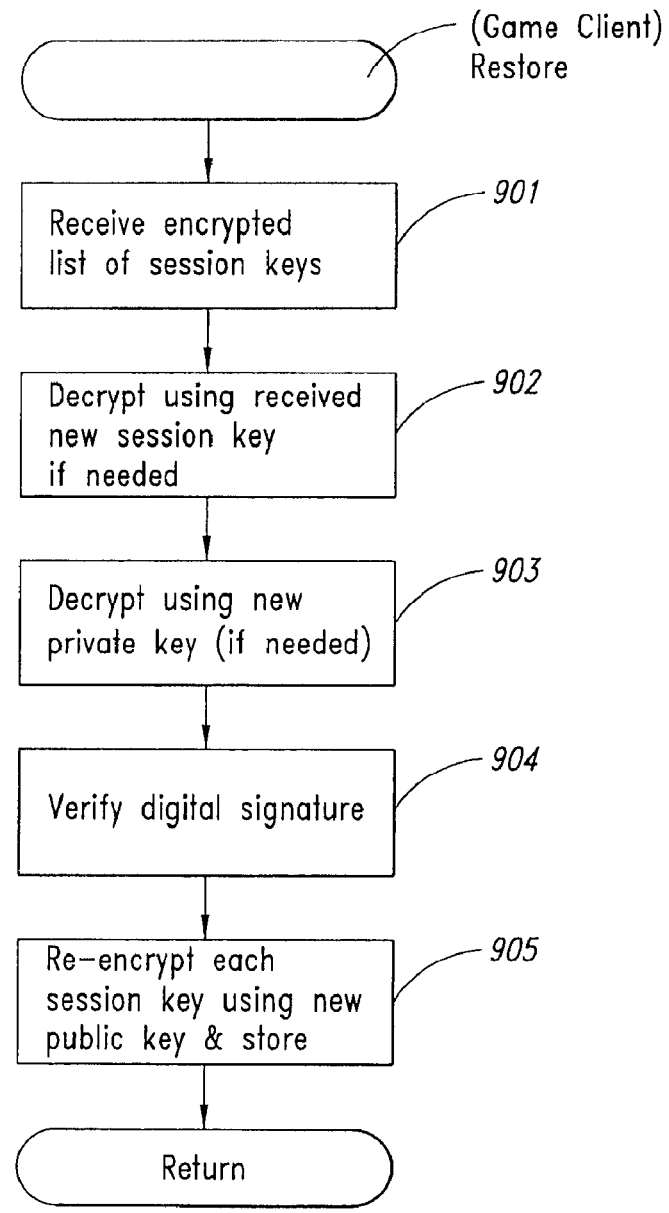
FIG. 9 is an example flow diagram of game client restore routine for restoring access to previously downloaded data.

FIG. 9 is an example flow diagram of game client restore routine for restoring access to previously downloaded data. Specifically, in step 901, the game client receives the encrypted list with the optional digital signature from the game server. In step 902, if a session has been established as above under step 806, the communication is decrypted using the one-time session key established under step 806. In step 903, if the list of one-time session keys has been encrypted using the game client's public key, then the game client decrypts the encrypted list of one-time session keys by using the game client's private key. Because only the game client should have access to the game client's private key, only the game client should have access to the encrypted information. Finally, in step 904, if a digital signature of a file containing the list of one-time session keys has been provided, the game client verifies the digital signature by using the game server's public key. This involves decrypting the digital signature that was encrypted using the game server's public key, using the same hash-like algorithm to produce a second digital signature of the file containing the list of one-time session keys, and verifying that the newly created digital signature is equivalent to the digital signature that was extracted from the encrypted communications from the game server. In step 905, the game client re-encrypts each of the one-time session keys using the game client's public key. The list of one-time session keys can be used as needed to extract the information contained in the previously downloaded encrypted files since the game client now has access to the information of what files were encrypted using which session keys.

In some cases, it is desirable to establish proxy communications between the game server and another server wherein the game server acts as a proxy for the game client. Such a technique is particularly applicable where the game server stores state information regarding the client because both the game client and the game server need to report information, for example, regarding ad exposure events as described in the concurrently filed patent application entitled "Method and System for Dynamically Incorporating Advertising Content Into Multimedia Environments." A difficulty with this scenario is that it is never acceptable to share the game client's private key with anyone else. Thus the GSF uses a different mechanism for proxy communications. Specifically, proxy communications can be accomplished by first having the game client inform the ad server of which game server it is connected to. This can be accomplished by the game client signing a copy of the game server's public key (generating a client ID token) and sending it to the game server and to the ad server (or other third party server to whom the proxy communications are to be directed). The game server, then acting as a proxy, signs and encrypts proxy messages with its own private key as usual, but also adds the client ID token. For maximum security, the client ID token should be placed in the proxy message text prior to the game server signing and encrypting it.

In another related embodiment, the detection of fraudulent subscription downloads by real-time analysis of data-download patterns is provided. IP-addresses are matched with public keys and compared to download times and frequencies to statistically determine if the same machines are attempting downloads in the same manner.

From the foregoing it will be appreciated that, although specific embodiments of the invention have been described herein for purposes of illustration, various modifications may be made without deviating from the spirit and scope of the invention. For example, one skilled in the art will recognize that the methods and systems discussed herein are applicable to other areas and devices other than video games with subscription game software, for example, subscription downloads of software to PDAs, pagers, e-mail, Web browsers, newsreaders, online books, navigation devices, other multimedia devices and environments, etc., could also incorporate the techniques described herein. One skilled in the art will also recognize that the methods and systems discussed herein are applicable to differing protocols and communication media (optical, wireless, cable, etc.) and that the techniques described herein may be embedded into such a system. Also, all of the above U.S. patents, patent applications, and publications referred to in this specification, including U.S. Provisional Application No. 60/250,058, filed on Nov. 29, 2000, and entitled "Method and System for Distributing Subscription Game Software" are incorporated herein by reference, in their entirety. Aspects of the invention can be modified, if necessary, to employ methods, systems, and concepts of these various patents, applications, and publications to provide yet further embodiments of the invention. In addition, those skilled in the art will understand how to make changes and modifications to the methods and systems described to meet their specific requirements or conditions.

The embodiments of the invention in which an exclusive property or privilege is claimed are defined as follows:

1. A method in a computer system for providing access to previously downloaded secure data comprising:
   registering a subscriber at the computer system by receiving a public key portion of a first asymmetric encryption key pair;
   establishing a session at the computer system with the registered subscriber, including generating a first symmetric session key;
   exchanging encrypted subscription data with a client computer system from the computer system using a combination of the first symmetric session key and the public key portion of the first asymmetric encryption key pair;
   re-registering the subscriber at the computer system;
   establishing a second session at the computer system with the re-registered subscriber, including generating a second symmetric session key; and
   enabling decryption of the previously exchanged encrypted subscription data without causing the previously exchanged encrypted subscription data to be re-downloaded by forwarding a list of previously used one-time session keys to the client computer system, wherein the list includes at least the first symmetric session key, and wherein the list is encrypted using a public key portion of a second asymmetric encryption key pair.

2. The method of claim 1, wherein the subscription data comprises computer game data.

3. The method of claim 1, wherein the computer system device comprises a network card.

4. The method of claim 1, wherein the client computer system comprises a computer game console.

5. The method of claim 1, wherein the computer system comprises a computer game environment.

6. The method of claim 1, wherein the subscription data pertains to a Massive Multiplayer Role Playing Game.

7. The method of claim 1, wherein the subscription data comprises information regarding advertisement downloading events.

8. A non-transitory computer-readable storage medium containing instructions for execution by a computing device, the instructions comprising:
   instructions to register a subscriber by receiving a public key portion of a first asymmetric encryption key pair;
   instructions to establish a session with the registered subscriber, including generating a first symmetric session key;
   instructions to exchange encrypted subscription data with a client computer system using a combination of the first symmetric session key and the public key portion of the first asymmetric encryption key pair;
   instructions to re-register the subscriber using a public key portion of a second asymmetric encryption key pair;
   instructions to establish a second session with the re-registered subscriber, including generating a second symmetric session key; and
   instructions to enable decryption of the previously exchanged encrypted subscription data without causing the previously exchanged data to be re-downloaded by forwarding a list of previously used one-time session keys to the client computer system, wherein the list includes at least the first symmetric session key, and wherein the list is encrypted using the public key portion of the second asymmetric encryption key pair.

9. The non-transitory computer-readable storage medium of claim 8, wherein the subscription data comprises computer game data.

10. The non-transitory computer-readable storage medium of claim 8, wherein the computing device comprises a network card.

11. The non-transitory computer-readable storage medium of claim 8, wherein the client computer system comprises a computer game console.

12. The non-transitory computer-readable storage medium of claim 8, wherein the computing device comprises a computer game environment.

13. The non-transitory computer-readable storage medium of claim 8, wherein the subscription data pertains to a Massive Multiplayer Role Playing Game.

14. The non-transitory computer-readable storage medium of claim 8, wherein the subscription data comprises information regarding advertisement downloading events.

15. A system comprising:
   a memory; and
   a processor operably connected to the memory, wherein the processor is configured to:
      register a subscriber by receiving a public key portion of a first asymmetric encryption key pair;
      establish a session with the registered subscriber, including generating a first symmetric session key and exchanging encrypted subscription data with a client computer system using a combination of the first symmetric session key and the public key portion of the first asymmetric encryption key pair;
      re-register the subscriber in accordance with a public key portion of a second asymmetric encryption key pair;
      establish a second session with the re-registered subscriber, including generating a second symmetric session key; and
      enable decryption of the previously exchanged encrypted subscription data without causing the previously exchanged data to be re-downloaded by forwarding a list of previously used one-time session keys to the client computer system, wherein the list includes at least the first symmetric session key, and wherein the list is encrypted using the public key portion of the second asymmetric encryption key pair.

16. The system of claim 15, wherein the subscription data comprises computer game data.

17. The system of claim 15, further comprising a network card.

18. The system of claim 15, wherein the client computer system comprises a computer game console.

19. The system of claim 15, wherein the system comprises a computer game environment.

20. The system of claim 15, wherein the subscription data pertains to a Massive Multiplayer Role Playing Game.

* * * * *

UNITED STATES PATENT AND TRADEMARK OFFICE
CERTIFICATE OF CORRECTION

PATENT NO. : 8,554,680 B2  
APPLICATION NO. : 12/185038  
DATED : October 8, 2013  
INVENTOR(S) : Newcombe It is certified that error appears in the above-identified patent and that said Letters Patent is hereby corrected as shown below:

In the Drawings:

In Fig. 2, Sheet 2 of 9, for Tag "203", in Line 1, delete "Pass-phase" and insert -- Pass-Phrase --, therefor.

In Fig. 4, Sheet 4 of 9, for Tag "402", in Line 1, delete "$GSF_c$ Registration Process" and insert -- GSF Registration Process --, therefor.

In the Specifications:

In Column 2, Line 31, delete "DESCRIPTION OF THE DRAWINGS" and insert -- BRIEF DESCRIPTION OF THE DRAWINGS --, therefor.

In Column 4, Lines 18-19, delete "game client software 200)" and insert -- game client software 201) --, therefor.

In the Claims:

In Column 11, Line 35, in Claim 3, delete "device comprises" and insert -- comprises --, therefor.

Signed and Sealed this  
Twenty-ninth Day of April, 2014

Michelle K. Lee  
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,554,680 B2 | Page 1 of 1 |
| APPLICATION NO. | : 12/185038 | |
| DATED | : October 8, 2013 | |
| INVENTOR(S) | : Newcombe | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1218 days.

Signed and Sealed this
Tenth Day of March, 2015

Michelle K. Lee
*Deputy Director of the United States Patent and Trademark Office*